United States Patent [19]
Crabbe et al.

[11] 3,821,288
[45] June 28, 1974

[54] 16, 17-SECO-A-NOR STEROIDS

[75] Inventors: Pierre Crabbe, Mexico City, Mexico; John H. Fried, Palo Alto, Canada

[73] Assignee: Syntex (U.S.G.) Inc., Palo Alto, Calif.

[22] Filed: July 1, 1971

[21] Appl. No.: 159,010

[52] U.S. Cl........ 260/488 B, 260/340.9, 260/345.9, 260/347.8, 260/404, 260/408, 260/410, 260/468 G, 260/471 R, 260/476 C, 260/482 R, 260/484 R, 260/487, 260/514 G, 260/586 H, 260/590, 260/598, 260/611 A, 260/611 F, 424/299, 424/305, 424/308, 424/309, 424/311, 424/312, 424/314

[51] Int. Cl.. C07c 49/45, C07c 69/14, C07c 69/24, C07c 69/78, C07c 69/74

[58] Field of Search.........260/488 B, 586 H, 476 C

[56] References Cited
UNITED STATES PATENTS

| | | | |
|---|---|---|---|
| 2,806,039 | 9/1957 | Murray | 260/476 C |
| 3,636,072 | 1/1972 | Cross et al. | 260/476 C |
| 3,704,324 | 11/1972 | Uskokovic et al. | 260/476 C |
| 3,716,578 | 2/1973 | Johnk | 260/488 CD |

*Primary Examiner*—Vivian Garner
*Attorney, Agent, or Firm*—William B. Walker; Walter H. Dreger; Joseph I. Hirsch

[57] ABSTRACT

New 16,17-seco-steroidal compounds of the A-nor estrane and androstane series, unsaturated at C-3, useful as antiandrogenic agents, and methods for their preparation.

10 Claims, No Drawings

16,17-SECO-A-NOR STEROIDS

The present invention relates to novel polyhydrophenanthrene derivatives and processes and intermediates useful for the synthesis thereof.

More particularly, this invention relates to certain novel 16,17-seco steroids of the 13-alkyl-A-nor estrane and androstane series, represented by the following formula:

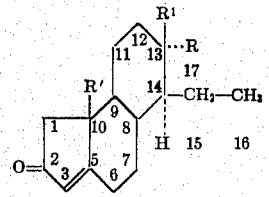

wherein R represents a lower alkyl group, carboxy (COOH) and the alkyl esters thereof, acetyl or a hydroxylated hydrocarbon radical represented by the formulas:

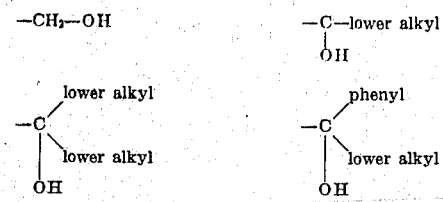

and the corresponding conventionally hydrolyzable esters and ethers thereof;

$R^1$ represents a lower alkyl radical, particularly methyl and ethyl; and $R'$ represents hydrogen or methyl.

The compounds trisubstituted at C-17 have asymmetric carbon atoms and the various steroisomers are included within the scope of this invention.

The term "lower alkyl" as used herein refers to straight or branched alkyl groups containing up to four carbon atoms, e.g. methyl, ethyl, n-propyl, isopropyl, n-butyl, and the like.

The term "conventional hydrolyzable esters and ethers" as used herein refers to hydrolyzable carboxylic ester and ether groups known conventionally in the art. These hydrolyzable carboxylic esters are derived from both substituted and unsubstituted hydrocarbon carboxylic acids. These acids can be completely saturated or possess varying degrees of unsaturation (including aromatic), can be of straight chain, branched chain, or cyclic structure, and preferably contain from one to 12 carbon atoms. In addition, they can be substituted by functional groups, for example, hydroxy, alkoxy containing up to six carbon atoms, acyloxy containing up to 12 carbon atoms, nitro, amino, halogeno, and the like, attached to the hydrocarbon backbone chain. Typical ester groups include acetate, propionate, butyrate, trimethylacetate, valerate, methylethylacetate, caproate, t-butylacetate, 3-methylpentanoate, enanthate, caprylate, trimethylacetate, pelargonate, decanoate, undecenoate, benzoate, phenylacetate, diphenylacetate, cyclopentylpropionate, methoxy acetate, aminoacetate, diethylaminoacetate, trichloroacetate, β-chloropropionate, bicyclo-[2.2.2]-octane-1'-carboxylate, adamantoate, and the like. Typical ether groups are methyl ether, ethyl ether, cyclopentyl ether, cyclohexyl ether, propyl ether, tetrahydropyran-2'-yl ether, tetrahydrofuran-2'-yl ether, 4'-methoxytetrahydropyran-4'-yl ether, and the like.

The compounds of the present invention are valuable pharmaceutical agents possessing anti-androgenic activity. They are of particular utility for the treatment of hyperandrogenic conditions such as acne, prostatic hypertrophy, hirsutism in the female, seborrheic dermatitis, and the like.

The compounds of the present invention are obtained by a process illustrated by the following sequence of reactions:

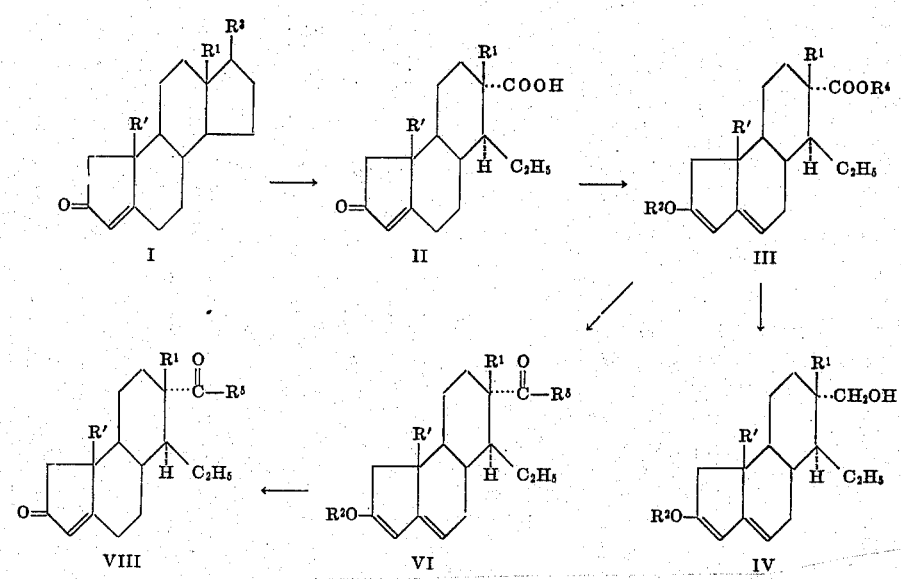

VIII—Continued         VI—Continued         IV—Continued

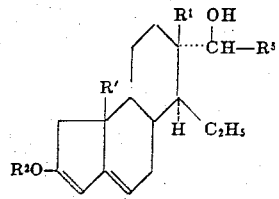
IX

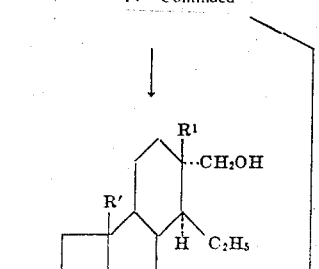
VII

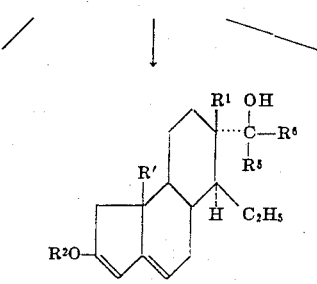
V

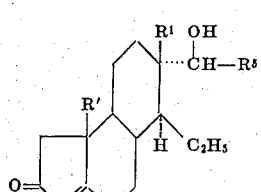
XI

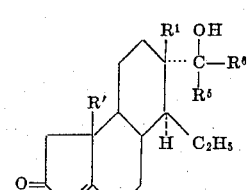
X

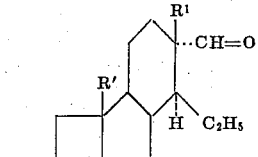
XII

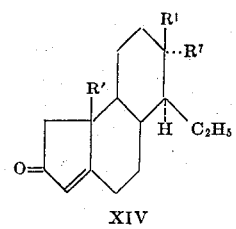
XIV

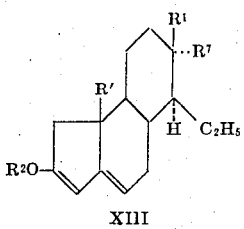
XIII wherein, $R^1$ and $R'$ have the above-indicated meaning;

$R^2$ represents a lower alkyl group such as methyl or ethyl;

$R^3$ represents a keto group or β-hydroxy-α-hydrogen;

$R^4$ represents hydrogen or lower alkyl;

$R^5$ and $R^7$ represent a lower alkyl group and $R^6$ represents a lower alkyl group or phenyl.

In practicing the process outlined above, a 2-keto-13-alkyl-A-norestr-3-ene or -androst-3-ene compound of formula I is submitted to alkali fusion by heating with an excess of a strong alkali metal hydroxide such as sodium hydroxide or potassium hydroxide, at a temperature of from about 250° to about 300°C. for a period of time of the order of 1 to 3 hours, to yield the corresponding 2-keto-A-nor-16,17-secoestr- or androst-3-en-17-oic acid (II). This acid is then esterified under conventional conditions, for example by reaction with a diazoalkane such as diazomethane or diazoethane in ether solution, and the alkyl ester thus obtained is converted into the 3-enol ether, e.g. the 3-ether enol ether (III, $R^2$= ethyl, $R^4$ = methyl or ethyl) by reaction with a lower alkyl orthoformate such as ethyl orthoformate in an inert organic solvent and in the presence of an acid catalyst, using particularly p-toluenesulfonic acid as catalyst.

Reduction of compound III ($R^4$ = methyl or ethyl) with a double metal hydride, using particularly lithium aluminum hydride affords the corresponding 2-ethoxy-16,17-seco-A-norestra- or androsta-2,5-dien-17-ol (IV), which upon acid hydrolysis of the 2-enol ether protecting group, using a strong mineral or organic acid such as hydrochloric acid or p-toluenesulfonic acid in acetone solution produces the 16,17-seco-A-norestr- or androst-3-en-17-ol-2-one compound (V).

By reaction of a 2-alkoxy-16,17-seco-A-norgona-2,5-dien-17-oic acid methyl ester (III) with from about equivalent amounts up to an excess of a lower alkyl magnesium halide such as methylmagnesium bromide, ethylmagnesium bromide, isopropyl magnesium bromide and the like in an inert organic solvent at reflux temperature for a prolonged period of time of the order of 15 to 24 hours, the corresponding 2-alkoxy-17-keto-17-alkyl-16,17-seco-A-nor-2,5-diene compound (VI) is produced, in mixture with the 2-alkoxy-17-hydroxy-17-dialkyl compound (VII, $R^6$=lower alkyl).

When a 2-alkoxy-17-keto-17-alkyl-16,17-seco-A-nor-2,5-diene (VI) is treated with phenyl lithium in tetrahydrofuran solution or with phenylmagnesium bromide in ether solution, at reflux temperature, there is obtained the 2-alkoxy-17-hydroxy-17-alkyl-17-phenyl-16,17-seco-A-nor-2,5-diene (VII, $R^6$=phenyl).

Reduction of the 17-keto compounds of formula VI with a double metal hydride such as sodium borohydride, lithium aluminum hydride and the like produces the corresponding 17-hydroxy compound (IX).

Acid hydrolysis of compounds of formulas VI, VII, and IX with p-toluenesulfonic acid or hydrochloric acid in acetone solution as described hereinabove, produces the corresponding 2-keto-$\Delta^3$ compounds, namely 13,1-

7-dialkyl-16,17-seco-A-norestr- or androst-3-ene-,17-dione (VIII), 13,17,17-trialkyl-16,17-seco-A-estr- or androst-3-en-17-ol-2-one (X, $R^6$=alkyl) 13,17-dialkyl-17-phenyl-16,17-seco-A-norestr- or androst-3-en-17-ol-2-one (X, $R^6$=phenyl) and 13,17-dialkyl-16,17-seco-A-norestr- or androst-3-en-17-ol-2-one, (XI).

Oxidation of a compound of formula IV, i.e., a 16,17-seco-17-hydroxylated compound with chromium trioxidepyridine complex gives rise to the corresponding 2-alkoxy-16,17-seco-A-norgona-2,5-dien-17-al (XII), which is then submitted to reduction of the aldehyde group to the corresponding 17-unsubstituted compound (XIII, $R^7$=methyl). The aldehyde group is eliminated by treatment of compound of formula XII with ethanedithiol or benzyl mercaptan to yield the 17-thioacetal followed by disulfurization with Raney nickel. Other reaction conditions include the Wolff-Kishner reduction of Clemmenson reduction. Acid treatment then regenerates and 2-keto-$\Delta^3$ system (XIV).

Similarly, carbonyl reduction of 2-alkoxy-17-keto-17-alkyl-16,17-seco-A-nor-2,5-diene compounds of formula VI, e.g. 2-ethoxy-13-alkyl-17-keto-17-methyl-16,17-seco-A-norestra- or androsta-2,5-diene produces the corresponding compounds substituted at C-17 by an alkyl group, e.g. 2-ethoxy-13-alkyl-17-methyl-16,17-seco-A-norestra- or androsta-2,5-diene compounds of formula XIII ($R^7$=alkyl of 2 to 4 carbon atoms) which in turn are hydrolyzed with p-toluenesulfonic or hydrochloric acid, to afford the corresponding 17-alkyl-16,17-seco-A-nor-3-en-2-one, e.g. 17-ethyl-16,17-seco-A-norestr-3-en-2-one (XIV, $R^1$=methyl, $R'$=hydrogen, $R^7$=alkyl of two to four carbon atoms) or 17-ethyl-16,17-seco-A-norandrost-3-en-2-one (XIV, $R^1$=methyl $R'$=methyl, $R^7$= alkyl of two to four carbon atoms). Carbonyl reduction of a compound of formula VI can be accomplished by, for example, a Wolff-Kishner reduction, i.e., by refluxing with hydrazine hydrate under strong alkaline conditions, a Clemmensen reduction, or thioketal formation followed by treatment with Raney nickel, as described above.

Alternatively, the above described sequence of reactions (II — XIV) can be carried out protecting the 2-keto function in the alkyl esters of compounds of formula II as the ethylenedioxy derivative. Thus, a 2-keto-A-nor-13-alkyl-16,17-seco-3-en-17-oic acid alkyl ester is treated with ethyleneglycol is an aromatic hydrocarbon solvent and in the presence of an acid catalyst, under the usual conditions for the preparation of ketals of $\alpha,\beta$-unsaturated steroids but prolonging the boiling period to about 2 to about 5 days with continuous removal of the azeotropic mixture of water-solvent formed during the reaction and replacement of the solvent discharged. There is produced a mixture of the ethylenedioxy derivatives having the double bond at C—3(5), C—5(6), and C—5(10)— which can be separated, if desired, via conventional methods or used as a mixture in the subsequent step.

The compounds possessing hydroxyl groups (formulas V, X and XI) can be esterified or etherified following the conventional esterification and etherification methods known to the skilled in the art, i.e., esterification with an acid anhydride or acid chloride in pyridine solution for the esterification of primary and secondary hydroxyl groups (V and XI) and with carboxylic acid anhydrides in benzene solution and in the presence of an acid catalyst such as p-toluenesulfonic acid or with a mixture of a carboxylic acid-carboxylic anhydride in the presence of an acid catalyst followed by mild alkaline or acid treatment for the $\Delta^3$-2-keto compounds having tertiary hydroxyl groups (X).

Etherification is also carried out by conventional techniques. Thus, reaction with dihydropyran, dihydrofuran or 4-methoxy-5,6-dihydro-2H-pyran in an inert solvent such as benzene and in the presence of an acid catalyst produces the tetrahydropyran-2'-yloxy, tetrahydrofuran-2'-yloxy or 4'-methoxytetrahydropyran-4'-yloxy derivatives, respectively. Methyl, ethyl, and cyclopentyl ethers, for example, are prepared upon reaction of the hydroxy compound with sodium hydride and methyl iodide, ethyl iodide and cyclopentyl bromide, respectively.

The starting compounds for the present invention are known. Thus, A-norestr-3-en-17-ol-2-one, A-norandrost-3-en-17-ol-2-one, and the corresponding 17-keto derivatives have been described for example in U.S. Pat. Nos. 3,210,406 and 3,439,040, which are herein incorporated by reference. The preparation of 13-ethyl-A-nor-3-en-17-ol-2-ones have also been described in the last mentioned patent.

These starting materials can be obtained by the methods described therein or by other methods of ring contraction used in the steroid art, see, for example, L. Ruzicka et al., *Helv. Chim. Acta.* 28, 1651 (1945); F. L. Weisenborn et al., *J. Am. Chem. Soc.*, 76 552 (1954); T. Jocobs and Takakaski, ibid 80, 4865 (1958); and K. Oka et al. *Chemical Communications*, 1969 p. 368.

The following examples serve to illustrate but are not intended to limit the scope of the present invention.

Example 1

A mixture of 300 g. of potassium hydroxide and 45 ml. of water is heated to 260°C. in a nickel crucible, 10 g. of A-norestr-3-en-17-ol-2-one are added and the temperature is then raised to 290° to 300°C., maintaining this temperature during 45 minutes. At the end of this time, the foaming mass formed is allowed to cool to room temperature, water is added and the reaction mixture let stand at said temperature overnight so the excess of potassium hydroxide dissolves. The aqueous solution is filtered through Celite, (diatomaceous earth) and the filtrate is made acidic by the addition of an excess of concentrated hydrochloric acid. The precipitate which forms is collected by filtration, washed with water and air dried, to produce 2-keto-16,17-seco-A-norestr-3-en-17-oic acid which can also be designated as 2-keto-13-methyl-16,17-seco-A-norgon-3-en-17-oic acid.

Alternatively, the foregoing reaction can be practiced upon starting steroids having a 6-membered A ring to give the corresponding 16,17-seco compounds followed by contraction of the A ring by the methods described in the art.

A solution of 9.5 g. of 2-keto-16,17-seco-A-norestr-3-en-17-oic acid in 200 ml. of methylene chloride is treated with 50 ml. of an ethereal solution of diazomethane and the mixture is kept at room temperature for one hour. The excess diazomethane is then destroyed by adding a few drops of acetic acid, the solvents are eliminated under vacuo and the residue is purified by t.l.c., to yield 2-keto-16,17-seco-A-norestr-3-en-17-oic acid methyl ester.

By the same methods, 2-keto-16,17-seco-A-norandrost-3-one-17-oic acid and its methyl ester, 2-keto-18-methyl-16,17-seco-A-norestr-3-en-17-oic acid and its methyl ester, and 2-keto-18-methyl-16,17-seco-A- norandrost-3-en-17-oic acid and its methyl ester are prepared.

Example 2

A suspension of 5 g. of 2-keto-16,17-seco-A-norestr-3-en-17-oic acid methyl ester in 70 ml. of anhydrous methylene chloride is treated with 10 ml. of freshly distilled ethyl orthoformate and 200 mg. of p-toluenesulfonic acid. The reaction mixture is stirred at room temperature for 30 minutes and to the resultant solution are added a few drops of pyridine. The solvents are evaporated to dryness under reduced pressure, and the crude product filtered through a column of 20 g. of Florisil, using hexane and hexane-methylene chloride 1:1 as eluant, to give 2-ethoxy-16,17-seco-A-norestra-2,5-dien-17-oic acid methyl ester.

A solution of 1.8 g. of 2-ethoxy-16,17-seco-A-norestra-2,5-dien-17-oic acid methyl ester in 20 ml. of anhydrous tetrahydrofuran is added dropwise, under stirring, to 1.8 g. of lithium aluminum hydride in 30 ml. of anhydrous tetrahydrofuran and the reaction mixture is refluxed for 3 hours. The reaction mixture is then cooled and the excess reagent destroyed by careful addition of saturated solution of sodium sulfate and solid sodium sulfate. The resulting mixture is filtered through Celite diatomaceous earth and the filtrate extracted several times with methylene chloride; the combined organic extracts are washed to neutral, dried over sodium sulfate and evaporated to dryness. Chromatography of the residue on silica gel, using hexane:ethyl acetate (60:40) as eluant affords 2-ethoxy-16,17-seco-A-norestra-2,5-dien-17-ol.

A mixture of 1 g. of 2-ethoxy-16,17-seco-A-norestra-2,5-dien-17-ol, 20 ml. of acetone and 0.5 ml. of concentrated hydrochloric acid is kept at room temperature for 5 hours. It is then diluted with water and extracted with methylene chloride. The organic extract is washed with water, sodium bicarbonate solution and water to neutral, dried over sodium sulfate and evaporated to dryness under reduced pressure. The residue is purified by t.l.c., to yield the pure 16,17-seco-A-norestr-3-en-17-ol-2-one, which is recrystallized from acetone-hexane.

In a similar manner, starting from 2-keto-18-methyl-16,17-seco-A-norestr-3-en-17-oic acid methyl ester there are successively obtained 2-ethoxy-18-methyl-16,17-seco-A-norestra-2,5-dien-17-oic acid methyl ester, 2-ethoxy-18-methyl-16,17-seco-A-norestra-2,5-dien-17-ol and 18-methyl-16,17-seco-A-norestr-3-en-17-ol-2-one. Similarly 16,17-seco-A-norandrost-3-en-17-ol-2-one and 16,17-seco-18-methyl-A-norandrost-3-en-17-ol-2-one are prepared.

Example 3

A solution of 16 g. of 2-ethoxy-16,17-seco-A-norestra-2,5-dien-17-oic acid methyl ester in 250 ml. of anhydrous tetrahydrofuran is treated with an excess (approximately 200 ml.) of 4N methylmagnesium bromide in ether and the mixture is refluxed with the exclusion of moisture for 18 hours. The cooled mixture is cautiously treated with excess aqueous ammonium chloride solution and the product isolated by extraction with methylene chloride. The extract is washed with water, dried over sodium sulfate and evaporated to dryness. The residue is purified by t.l.c. using a mixture of hexane-ethyl acetate (95:5) to produce 2-ethoxy-17-methyl-16,17-seco-A-norestra-2,5-dien-17-one and 2-ethoxy-17,17-dimethyl-16,17-seco-A-norestra-2,5-dien-17-ol.

The foregoing compounds are hydrolyzed with hydrochloric acid in acetone, in accordance with the method of the preceding Example, to yield 17-methyl-16,17-seco-A-norestr-3-en-2,17-dione and 17,17-dimethyl-16,17-seco-A-norestr-3-en-17-ol-2-one, respectively. Similarly, 17-methyl-16,17-seco-A-norandrost-3-ene-2,17-dione and 17,17-dimethyl-16,17-seco-A-norandrost-3-ene-2,17-dione.

Example 4

A solution of 1 g. of 2-ethoxy-16,17-seco-A-norestra-2,5-dien-17-ol in 20 ml. of pyridine is added to a mixture of 1 g. of chromium trioxide in 20 ml. of pyridine. The reaction mixture is allowed to stand at room temperature for 12 hours, and then diluted with ethyl acetate and filtered through Celite diatomaceous earth, washing the solid with hot ethyl acetate. The combined filtrates are washed well with water, dried over sodium sulfate and evaporated to dryness, thus producing 2-ethoxy-16,17-seco-A-norestra-2,5-dien-17-al which is purified by crystallization from acetone-ether. 9

A mixture of 1 g. of 2-ethoxy-16,17-seco-A-norestra-2,5-dien-17-al, 2 g. of hydrazine hydrate, 1.2 g. of potassium hydroxide, 1.2 ml. of water and 1.2 ml. of diethylene glycol is heated under reflux for 45 minutes. It is then heated in an open flask until the temperature of the reaction mixture reaches 200°C., a reflux condenser is attached, and refluxing is continued for 2 hours further. The solution is then cooled, water is added and the product isolated by extraction with ether. The combined organic extracts are washed with water to neutral, dried over sodium sulfate and evaporated to dryness under vacuo. The residue is dissolved in 20 ml. of acetone, 0.5 g. of p-toluenesulfonic acid is added and the mixture is kept at room temperature for 6 hours. The reaction mixture is then diluted with water and extracted with methylene chloride and the organic extracts washed with water to neutral, dried over sodium sulfate and evaporated to dryness under reduced pressure. The residue is purified by t.l.c., to give the pure 2-ethoxy-16,17-seco-A-norestra-2,5-diene.

Alternatively, the following procedure can be employed:

To a solution of 1 g. of 2-ethoxy-16,17-seco-A-norestra-2,5-dien-17-al in 5 ml. of ethyl ether are added 0.5 ml. of benzyl mercaptan and 3 drops of boron trifluoride etherate, and the mixture is kept at room temperature for 20 hours. It is then diluted with ether and the ethereal solution washed several times with 5 percent potassium hydroxide solution and water to neutral, dried and evaporated to dryness. The residue is dissolved in 150 ml. of ethanol, 5 g. of Raney nickel are added and the mixture is then refluxed under stirring for 24 hours. The suspension is then filtered through Celite diatomaceous earth, and the nickel is washed well with hot ethanol. The combined filtrate and washings are evaporated to dryness, and the residue purified by chromatography on Florisil, thus yielding 2-ethoxy-16,17-seco-A-norestra-2,5-diene.

Upon hydrolysis of the protecting group at C-2 with hydrochloric acid in acetone solution, in accordance with the method of Example 2, 16,17-seco-A-norestr-3-en-2-one is produced. Similarly, 16,17-seco-A-norandrost-3-en-2-one is produced in accordance with the methods of this example.

Example 5

The method of Example 3 is repeated with the exception of using ethereal ethylmagnesium bromide and n-propylmagnesium bromide as reagents instead of methylmagnesium bromide, to produce 2-ethoxy-17-ethyl-16,17-seco-A-norestra-2,5-dien-17-one, 2-ethoxy-17-ethyl-16,17-seco-A-norandrosta-2,5-dien-17-one, and 2-ethoxy-17,17-diethyl-16,17-seco-A-norestra-2,5-dien-17-ol, 2-ethoxy-17,17-diethyl-16,17-seco-A-norandrosta-2,5-dien-17-ol, and 2-ethoxy-17-propyl-16,17-seco-A-norestra-2,5-dien-17-one, 2-ethoxy-17-propyl-16,17-seco-A-norandrosta-2,5-dien-17-one, and 2-ethoxy-17,17-dipropyl-16,17-seco-A-norestra-2,5-dien-17-ol, 2-ethoxy-17,17-dipropyl-16,17-seco-A-norandrosta-2,5-dien-17-ol, respectively, which are in turn hydrolyzed with hydrochloric acid in acetone, by following the method of Example 2, to yield 17-ethyl-16,17-seco-A-norestr-3- -ene-2,17-dione, 17-ethyl-16,17-seco-A-norandrost-3-ene-2,17-dione, 17,17-diethyl-16,17-seco-A-norestr-3-en-17-ol-2-one, 17,17-diethyl-16,17-seco-A-norandrost-3-en-17-one-2-one, 17-propyl-16,17-seco-A-norestr-3-ene-2,17-dione, 17-propyl-16,17-seco-A-norandrost-3-ene-2,17-dione, 17,17-dipropyl-16,17-seco-A-norestr-3-en-17-ol-2-one, and 17,17-dipropyl-16,17-seco-A-norandrost-3-en-17-ol-2-one, respectively.

Example 6

A solution of 2 g. of 2-ethoxy-17-methyl-16,17-seco-A-norestra-2,5-dien-17-one in 250 ml. of anhydrous tetrahydrofuran is added dropwise to a solution of 10 molar equivalents of phenyl lithium in 150 ml. of ether with mechanical stirring and under an atmosphere of nitrogen. The mixture is then refluxed for 5 hours, cooled, poured into ice water and acidified with hydrochloric acid, stirring vigorously for 1 hour. The product is then extracted with methylene chloride and the organic extracts washed with water to neutral, dried over sodium sulfate and evaporated to dryness. Recrystallization of the residue from acetone-hexane yields 17-methyl-17-phenyl-16,17-seco-A-norestr-3-en-17-ol-2-one.

Similarly, 17-methyl-17-phenyl-16,17-seco-A-norandrost-3-en-17-ol-2-one is prepared.

Example 7

The methods of Examples 3 and 5 are repeated but using 2-ethoxy-18-methyl-16,17-seco-A-norestra-2,5-dien-17-oic acid methyl ester, and 2-ethoxy-18-methyl-16,17-seco-A-norandrosta-2,5-dien-17-oic acid methyl ester as starting materials thus respectively produced as final products:

18-methyl-17-methyl-16,17-seco-A-norestr-3-ene-2,17-dione,
18-methyl-17-methyl-16,17-seco-A-norandrost-3-ene-2,17-dione,
18-methyl-17,17-dimethyl-16,17-seco-A-norestr-3-en-17-ol-2-one,
18-methyl-17,17-dimethyl-16,17-seco-A-norandrost-3-en-17-ol-2-one,
17-ethyl-18-methyl-16,17-seco-A-norestr-3-ene-2,17-dione,
17-ethyl-18-methyl-16,17-seco-A-norandrost-3-ene-2,17-dione,
17,17-diethyl-18-methyl-16,17-seco-A-norestr-3-en-17-ol-2-one,
17,17-diethyl-18-methyl-16,17-seco-A-norandrost-3-en-17-ol-2-one,
18-methyl-17-propyl-16,17-seco-A-norestr-3-ene-2,17-dione,
18-methyl-17-propyl-16,17-seco-A-norandrost-3-ene-2,17-dione,
18-methyl-17,17-dipropyl-16,17-seco-A-norestr-3-en-17-ol-2-one, and
18-methyl-17,17-dipropyl-16,17-seco-A-norandrost-3-en-17-ol-2-one.

Example 8

A solution of 5 g. of sodium borohydride in 15 ml. of water is added to an ice-cold solution of 5 g. of 2-ethoxy-17-methyl-16,17-seco-A-norestra-2,5-dien-17-one in 250 ml. of methanol, and the reaction mixture is allowed to stand at room temperature for 16 hours. The excess reagent is decomposed by adding 2.5 ml. of acetic acid, the solution is concentrated to a small volume and diluted with water. The product is isolated by extraction with ethyl acetate and the organic extract is washed with water, dried and evaporated to dryness. The residue is dissolved in 50 ml. of acetone and treated with hydrochloric acid, in accordance with the hydrolysis method of Example 2, to yield 17-methyl-16,17-seco-A-norestr-3-en-17-ol-2-one.

In a similar manner, 17-methyl-16,17-seco-A-norandrost-3-en-17-ol-2-one is prepared and 2-ethoxy-18-methyl-17-methyl-16,17-seco-A-norestra-2,5-dien-17-one, and 2-ethoxy-18-methyl-17-methyl-16,17-seco-A-norandrosta-2,5-dien-17-one are converted respectively into 18-methyl-17-methyl-16,17-seco-A-norestr-3-en-17-ol-2-one and 18-methyl-17-methyl-16,17-seco-A-norandrost-3-en-17-ol-2-one.

Example 9

A mixture of 1 g. of 2-ethoxy-17-methyl-16,17-seco-A-norestra-2,5-dien-17-one, 2 g. of hydrazine hydrate, 1.2 g. of potassium hydroxide, 1.2 ml. of water and 1.2 ml. of diethylene glycol is heated under reflux for 45 minutes. It is then heated in an open flask until the temperature of the reaction mixture reaches 200°C., a reflux condenser is attached, and refluxing is continued for 2 hours further. The solution is then cooled, water is added and the product isolated by extraction with ether. The combined organic extracts are washed with water to neutral, dried over sodium sulfate and evaporated to dryness under vacuo. The residue is dissolved in 20 ml. of acetone, 0.5 g. of p-toluenesulfonic acid is added, and the mixture is kept at room temperature for 6 hours. The reaction mixture is then diluted with water and extracted with methylene chloride and the organic extracts washed with water to neutral, dried over sodium sulfate and evaporated to dryness under reduced pressure. The residue is purified by t.l.c., to give the pure 17-methyl-16,17-seco-A-norestr-3-en-2-one.

In a similar manner, 17-methyl-16,17-seco-A-norandrost-3-en-2-one is prepared and starting from 2-ethoxy-18-methyl-17-methyl-16,17-seco-A-norestra-2,5-dien-17-one and 18-methyl-17-methyl-16,17-seco-A-norandrosta-2,5-dien-17-one there is respectively prepared 18-methyl-17-methyl-16,17-seco-A-norestr-3-en-2-one and 18-methyl-17-methyl-16,17-seco-A-norandrost-3-en-2-one.

Example 10

A mixture of 1.5 g. of 16,17-seco-A-norestr-3-en-17-ol-2-one, 10 ml. of pyridine and 5 ml. of acetic anhydride is kept at room temperature for 18 hours. The mixture is then poured into ice water and the formed precipitate collected by filtration, washed with water and dried. Crystallization from ether affords 17-acetoxy-16,17-seco-A-norestr-3-en-2-one in pure form.

In like manner, using propionic, caproic and cyclopentylpropionic anhydrides as esterifying agents in lieu of acetic anhydride the corresponding 17-propionoxy, 17-caproxy and 17-cyclopentylpropionoxy derivatives of 16,17-seco-A-norestr-3-en-2-one are obtained. Similarly, the corresponding esters of 16,17-seco-A-norandrost-3-en-2-one are obtained.

Example 11

To a cold solution of 1 g. of 16,17-seco-A-norestr-3-en-17-ol-2-one in 40 ml. of pyridine is added 6 ml. of heptanoyl chloride and the reaction mixture is allowed to stand for 18 hours at room temperature. The reaction mixture is then concentrated to a small volume under vacuo, diluted with water and extracted with methylene chlorode; the organic extracts are washed with water to neutrality, dried over sodium sulfate and evaporated to dryness under reduced pressure. Crystallization of the residue from acetone-hexane gives 17-heptanoyloxy-16,17-seco-A-norestr-3-en-2-one.

By the same method, 17-heptanoyloxy-16,17-seco-A-norandrost-3-en-2-one, 18-methyl-16,17-seco-A-norestr-3-en-2-one and 18-methyl-16,17-seco-A-norandrost-3-en-2-one are prepared.

Example 12

Two milliliters of dihydropyran are added to a solution of 1 g. of 16,17-seco-A-norestr-3-en-17-ol-2-one in 15 ml. of benzene. About 1 ml. is removed by distillation to remove moisture and 0.4 g. of p-toluenesulfonyl chloride is added to the cooled solution. This mixture is allowed to stand at room temperature for four days, and is then washed with aqueous sodium carbonate solution and water, dried and evaporated. The residue is chromatographed on neutral alumina, eluting with hexane, to yield 17-tetrahydropyran-2'-yloxy-16,17-seco-A-norestr-3-en-2-one which is recrystallized from pentane.

By employing the method of the preceding paragraph using dihydrofuran in lieu of dihydropyran, there is prepared the corresponding 17-tetrahydrofuran-2'-yloxy-16,17-seco-A-norestr-3-en-2-one product. Similarly, 17-(4'-methoxytetrahydropyran-4'-yloxy)-16,17-seco-A-norestr-3-en-2-one is prepared by utilization of the foregoing procedure employing 4-methoxy-5,6-dihydro-2H-pyran in lieu of dihydropyran.

In a similar manner, the tetrahydropyranyl-, tetrahydrofuranyl and 4'-methoxytetrahydropyranyl ethers of 16,17-seco-A-norandrost-3-en-17-ol-2-one, 18-methyl-16,17-seco-A-norestr-3-en-17-ol-2-one, 18-methyl-16,17-seco-A-norandrost-3-en-17-ol-2-one, 17,17-dimethyl-16,17-seco-A-norestr-3-en-17-ol-2-one 17,17-dimethyl-16,17-seco-A-norandrost-3-en-17-ol-2-one, 17-methyl-17-phenyl-16,17-seco-A-norestr-3-en-17-ol-2-one, 17-methyl-17-phenyl-16,17-seco-A-norandrost-3-en-17-ol-2-one are obtained.

Example 13

A solution of one chemical equivalent of 16,17-seco-A-norestr-3-en-17-ol-2-one in 30 ml. of benzene is heated to reflux and about 2 ml. removed by distillation to eliminate moisture. The mixture is cooled to room temperature and two chemical equivalents of sodium hydride are added, followed by the dropwise addition of two chemical equivalents of cyclopentyl bromide in 10 ml. of benzene, over a period of 20 minutes. The mixture is allowed to reflux for 20 hours after which time the precipitate of sodium bromide is removed by filtration and the organic phase dried and evaporated to yield 17-cyclopentyloxy-16,17-seco-A-norestr-3-en-2-one which is further purified upon recrystallization from pentane.

Alternatively, methyl iodide and ethyl iodide can be used in lieu of cyclopentyl bromide to produce 17-methoxy-16,17-seco-A-norestr-3-en-2-one and 17-ethoxy-16,17-seco-A-norestr-3-en-2-one, respectively.

Likewise, the 17-cyclopentyl, methyl and ethyl ethers of 16,17-seco-A-norandrost-3-en-17-ol-2-one, 18-methyl-16,17-seco-A-norestr-3-en-17-ol-2-one and 18-methyl-16,17-seco-A-norandrost-3-en-17-ol-2-one are obtained.

Example 14

A mixture of 1 g. of 17,17-dimethyl-17-hydroxy-16,17-seco-A-norestr-3-en-2-one, 2 ml. of acetic anhydride, 5 ml. of acetic acid and 1 g. of p-toluenesulfonic acid is kept at room temperature for 2 hours. The reaction mixture is then diluted with water, extracted with methylene chloride and the organic extracts washed with water and evaporated to dryness under vacuo. The residue is dissolved in 20 ml. of methanol, 0.2 ml. of concentrated hydrochloric acid are added and the reaction mixture is allowed to stand at room temperature for 1 hour. It is then diluted with water, extracted with methylene chloride and the combined organic extracts washed with water, sodium bicarbonate solution and water to neutral, dried over sodium sulfate and evaporated to dryness under vacuo. Crystallization of the residue from acetone-ether gives 17,17-dimethyl-17-acetoxy-16,17-seco-A-norestr-3-en-2-one.

By using propionic anhydride and enanthic anhydride in place of acetic anhydride the corresponding propionate and enanthate of 17,17-dimethyl-17-hydroxy-16,17-seco-A-norestr-3-en-2-one are obtained.

In a similar manner, the corresponding acetate, propionate, and enanthate esters of 17,17-dimethyl-16,17-seco-A-norestr-3-en-17-ol-2-one, 18-methyl-17,17-dimethyl-16,17-seco-A-norestr-3-en-17-ol-2-one, and 18-methyl-17,17-dimethyl-16,17-seco-A-norandrost-3-en-17-ol-2-one are prepared.

Example 15

A mixture of 5 g. of 2-keto-16,17-seco-A-norestr-3-en-17-oic acid methyl ester, 250 ml. of anhydrous benzene, 60 ml. of ethyleneglycol distilled over sodium hydroxide and 800 mg. of p-toluenesulfonic acid monohydrate is refluxed for 80 hours using a Dean stark trap for the continuous removal of the water formed during the reaction. The solvent eliminated is replaced periodically. At the end of this time the reaction mixture is cooled, sodium bicarbonate solution added to the cooled mixture and the organic phase is separated, washed with water, dried over sodium sulfate and evaporated to dryness. The residue is purified by chromatography on Florisil. The fractions eluted with hexane-benzene 75:25 contain the 2-ethylene-dioxy-16,17-seco-A-norestr-3-en-17-oic acid methyl ester in mixture with the $\Delta^{5(6)}$ and $\Delta^{5(10)}$ isomers.

A solution of 1 g. of the mixture of ketals is reduced with lithium aluminum hydride in anhydrous tetrahydrofuran, by following the method of Example 2, and the crude 17-hydroxylated compound thus obtained is hydrolyzed with p-toluenesulfonic acid in acetone, in accordance with the method of Example 9, to produce 16,17-seco-A-norestr-3-en-17-ol-2-one, identical to the obtained in Example 2.

What is claimed is:

1. A compound selected from those represented by the following formula:

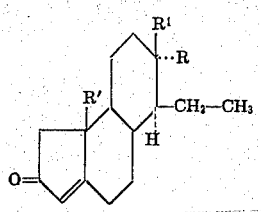

wherein R is a hydroxylated hydrocarbon radical represented by the formulas:

   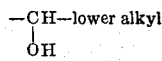

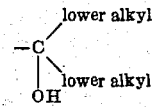

and the corresponding hydrolyzable hydrocarbon carboxylic acid esters thereof wherein the carboxylic acid moiety has from 1 to 12 carbon atoms;

R¹ is lower alkyl; and

R' is hydrogen or methyl.

2. A compound according to claim 1 wherein R¹ is methyl or ethyl.

3. A compound according to claim 2 wherein R is hydroxymethyl or the esters thereof.

4. A compound according to claim 2 wherein R is the group

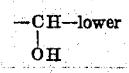

alkyl and the esters thereof.

5. A compound according to claim 2 wherein R is the group

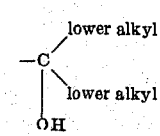

and the esters thereof.

6. A compound according to claim 1 wherein R¹ is methyl and R' is hydrogen.

7. A compound according to claim 6 wherein R is hydroxymethyl; 16,17-seco-A-norestr-3-en-17-ol-2-one.

8. A compound according to claim 6 wherein R is acetoxymethyl; 17-acetoxy-16,17-seco-A-norestr-3-en-2-one.

9. A compound according to claim 6 wherein R is heptanoyloxymethyl; 17-heptanoyloxy-16,17-seco-A-norestr-3-en-2-one.

10. A compound according to claim 6 wherein R is the group

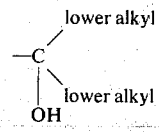

in which each lower alkyl is methyl; 17,17-dimethyl-16,17-seco-A-norestr-3-en-17-ol-2-one.

* * * * *